(12) United States Patent
Bence et al.

(10) Patent No.: US 7,445,935 B2
(45) Date of Patent: Nov. 4, 2008

(54) PROCESS AND APPARATUS FOR LOADING A PARTICULATE SOLID INTO A VERTICAL TUBE

(75) Inventors: Roger K. Bence, London (GB); Michael Hilton, Stockton-on-Tees (GB); Mark A. Linthwaite, Northallerton (GB)

(73) Assignee: Davy Process Technology Limited, London (GB)

( * ) Notice: Subject to any disclaimer, the term of this patent is extended or adjusted under 35 U.S.C. 154(b) by 878 days.

(21) Appl. No.: 10/479,672

(22) PCT Filed: Jun. 5, 2002

(86) PCT No.: PCT/GB02/02554

§ 371 (c)(1),
(2), (4) Date: Dec. 4, 2003

(87) PCT Pub. No.: WO02/098552

PCT Pub. Date: Dec. 12, 2002

(65) Prior Publication Data

US 2004/0146457 A1    Jul. 29, 2004

(30) Foreign Application Priority Data

Jun. 6, 2001 (GB) ................ 0113789.2

(51) Int. Cl.
| | |
|---|---|
| *G01N 31/10* | (2006.01) |
| *B01J 8/28* | (2006.01) |
| *B01J 8/44* | (2006.01) |
| *B01J 19/24* | (2006.01) |
| *B01D 15/22* | (2006.01) |
| *B01D 15/08* | (2006.01) |
| *B01D 15/18* | (2006.01) |

(52) U.S. Cl. ............ 436/37; 210/198.2; 422/69; 422/70; 422/129; 422/130; 422/131; 422/134; 422/139; 422/141; 422/142; 422/188; 422/189; 422/193; 436/161

(58) Field of Classification Search .......... 210/198.2; 422/58–60, 69–70, 129, 130, 131, 134, 139, 422/141–142, 188–189, 193; 436/37, 161
See application file for complete search history.

(56) References Cited

U.S. PATENT DOCUMENTS

| | | | |
|---|---|---|---|
| 2,203,840 A | | 6/1940 | Perkins |
| 3,487,938 A | * | 1/1970 | Patterson ............... 210/198.2 |
| 3,539,304 A | | 11/1970 | Mevenkamp et al. |
| 3,615,235 A | * | 10/1971 | Hrdina .................. 422/70 |
| 3,628,314 A | | 12/1971 | McCarthy et al. |
| 3,818,667 A | | 6/1974 | Wagner |
| 3,838,977 A | | 10/1974 | Warren |
| 3,966,609 A | * | 6/1976 | Godbille et al. ......... 210/198.2 |
| 3,990,858 A | | 11/1976 | O'Sullivan et al. |
| 4,029,486 A | | 6/1977 | Frantz |
| 4,051,019 A | | 9/1977 | Johnson |
| 4,052,166 A | | 10/1977 | Mita et al. |
| 4,063,900 A | | 12/1977 | Mita et al. |
| 4,077,530 A | | 3/1978 | Fukusen et al. |
| 4,203,950 A | | 5/1980 | Sederquist |
| 4,336,042 A | | 6/1982 | Frantz et al. |
| 4,489,549 A | | 12/1984 | Kasabian |
| 4,505,105 A | | 3/1985 | Ness |
| 4,554,784 A | | 11/1985 | Weigand et al. |
| 4,597,866 A | * | 7/1986 | Couillard ............... 210/198.2 |
| 4,711,764 A | * | 12/1987 | Good ..................... 422/65 |
| 4,997,465 A | | 3/1991 | Stanford |
| 5,098,453 A | | 3/1992 | Turner et al. |
| 5,118,331 A | | 6/1992 | Garrett et al. |
| 5,247,970 A | | 9/1993 | Ryntveit et al. |
| 5,718,881 A | | 2/1998 | Sederquist et al. |
| 5,877,331 A | | 3/1999 | Mummey et al. |
| 5,892,108 A | | 4/1999 | Shiotani et al. |
| 5,935,277 A | | 8/1999 | Autenrieth et al. |
| 6,046,343 A | | 4/2000 | Mummey et al. |

FOREIGN PATENT DOCUMENTS

| | | |
|---|---|---|
| DE | 1 296 127 | 5/1959 |
| DE | 1 063 128 | 8/1959 |
| DE | 1 090 643 | 10/1960 |

| | | |
|---|---|---|
| JP | 04 119902 | 4/1992 |
| WO | WO 96/15850 A1 | 5/1996 |

\* cited by examiner

*Primary Examiner*—Arlen Soderquist
(74) *Attorney, Agent, or Firm*—Senninger Powers LLP (57) ABSTRACT

A process is described in which an elastic fluid is contacted with a particulate solid. This comprises providing a substantially vertical elongate tubular containment zone (1) containing a charge of the particulate solid (5), the volume of the containment zone (1) being greater than the settled volume of the particulate solid (5). An upper retainer means (3) is mounted at the upper end of the containment zone (1), the upper retainer means (3) being permeable to the fluid but adapted to retain particulate solid (5) in the containment zone (1). A follower means (4) is movably mounted in the containment zone (1) beneath the charge of particulate solid (5) for movement upwardly from the lower end of the containment zone (1) upon upward flow of elastic fluid through the containment zone (1) at a rate beyond a threshold rate. In the process the elastic fluid is caused to flow upwardly through the containment zone (1) at a rate which is sufficient to cause particulate solid (5) to rise up towards the upper end of the containment zone and form a cushion of particulate solid (5) against the underside of the upper retainer means (3). This rate is in excess of the threshold rate so as to cause the follower means (4) to move upwardly until it abuts against the underside of the cushion of particulate solid (5). The invention also provides an apparatus suitable for carrying out such a process and a method of loading a particulate solid into a substantially vertical tube.

54 Claims, 5 Drawing Sheets

PROCESS AND APPARATUS FOR LOADING A PARTICULATE SOLID INTO A VERTICAL TUBE

1. TECHNICAL FIELD OF THE INVENTION

This invention relates to a process for contacting an elastic fluid with a particulate solid.

2. BACKGROUND OF THE INVENTION

There are many processes which involve contact between an elastic fluid, such as a gas or vapour, and a particulate solid. Thus many chemical processes are carried out using gas phase or vapour phase reaction conditions in which a gas or vapour stream is contacted with a particulate catalyst. Other processes in which an elastic fluid is contacted with a particulate solid include drying, in which a gas or vapour is contacted with a desiccant, and adsorption, in which a gas or vapour is contacted with an absorbent for the purpose of, for example, adsorption of potential catalyst poisons therefrom.

In such processes the particulate catalyst or other particulate solid is frequently in the form of a fixed bed, although some processes are operated using a fluidised catalyst bed.

The conditions used in such processes often include high operating temperatures and/or high pressures. Hence reactors may have to withstand high thermal and pressure stresses. Typical constructional materials for chemical process vessels accordingly include mild steel, high pressure steel, stainless steel and other special steels and alloys.

The use of catalysts, supported catalysts and other particulates, such as desiccants and adsorbents, in fixed bed applications is thus widespread. The particulate matter forming the fixed bed is typically ceramic in nature or formed from pelletised metal oxides. Usually it has a lower coefficient of expansion than the reactor, tube or other containment device for the particulate solid which is often composed of metal for pressure strength reasons. Thus, when the system increases in temperature, the particulate material slumps in the reactor because, upon heating, the walls of the reactor expand more than do the catalyst particles. Then when the temperature is later lowered, the walls of the reactor contract as it cools and the particulate matter may be caught as if by a tightening corset and thereby subjected to a crushing force, particularly if the particulate solid is contained in a substantially vertical metal tube.

In many applications the temperature variations in operation are not very high and the different amounts of expansion between the particulate matter and the containment device are not significant. Consequently excessive attrition of the particulate material or damage to container walls is not caused. However, in so-called fired processes which utilize high temperature operations, typically involving combustion in order to maintain the temperature in endothermic catalytic processes such as steam reforming, or in exothermic catalytic processes such as partial oxidation processes, the amounts of expansion involved are considerable. If the fixed bed is contained in a large diameter reactor or containment device, this differential expansion can be accommodated with only minor attrition of the catalyst particles since there are many particles and cumulative small movements of the catalyst particles into internal voidage will occur. However, if the catalyst particles are contained in a narrow vertical tube having, for example, a nominal diameter of less than about 6 inches (about 15.24 cm), this relative movement is insufficient and very high crushing forces can be generated. This tends to result in attrition of the particulate matter, if friable to any degree, or in damage to the tube wall, if not. The latter phenomenon has been observed with physically strong alumina catalyst support balls in high temperature reformer tubes. Furthermore, in cases where the vertical tubes are very long and experience considerable expansion over their length due to the high operating temperature being used, for example steam reformer tubes, the particulate matter drops by a very significant amount but cannot rise back up the tube when it cools due to being tightly squeezed by the cooling tube, a factor that exacerbates the crushing tendency.

Repeated heating and cooling cycles lead to a deterioration in the desired characteristics of the packed bed, in that the originally loaded volume of particulates is compressed to a higher density, thereby increasing the pressure drop. In addition it has been found that increased pressure drop through a catalyst bed can be caused by, amongst other reasons, breakage of catalyst particles resulting from incorrect charging of the catalyst or from differential expansion and contraction between the catalyst and the containing vessel due to temperature cycling at start-up and shut-down. The breakage of catalyst particles gives fragments of a smaller particle diameter, while erosion of the corners of particles gives a lower voidage due to the eroded particles packing more closely together. For further discussion reference may be made to "Catalyst Handbook", 2nd Edition, by Martyn V. Twigg (Wolfe Publishing Ltd., 1989), at page 125. This increased pressure drop generally increases the costs associated with gas compression in all fixed bed applications. In parallel fixed bed applications this can lead to increasing maldistribution, especially in a multi-tubular reactor, thereby causing different conversions and selectivities in different tubes. This, in turn, can lead to further problems such as carbon laydown, formation of hot spots (leading to possible tube failure and/or to sintering of the catalyst), and to development of different rates of catalyst deactivation which can further exacerbate the situation. Loss of catalyst surface material by spalling and attrition is particularly serious when the active part of the catalyst is in the form of a shallow surface layer, because in this case considerable catalyst activity can be lost or the catalyst activity can become maldistributed.

The debris from the crushing forces will accumulate in the, by now, more dense bed and also increase the pressure drop. There will be an increased likelihood of different pressure drops between different tubes in a multi-tubular reactor leading to maldistribution of the gas or vapour. In addition, the position of the top of the bed within any individual tube will be difficult to predict.

Another problem occurs with externally fired tubular reactors, such as reformers, in that any part of the tube that does not contain catalyst is liable to overheat, with a consequent danger of tube failure, since there is no endothermic reaction being catalysed in that part of the tube to absorb the radiant heat and hence to cool that part of the tube. This makes it important to determine as closely as possible the position of the catalyst bed during operation so as to minimize the risk of tube failure through local overheating.

There is, therefore, a need in the art to provide a reactor design which overcomes the problems associated with crushing of particulate materials when the reactor is subjected to temperature cycles of heating to high temperatures followed by cooling again, and which allows low pressure drop through the particulate material, minimizes pressure drop build-up, and allows the position of the bed to be fixed with a high degree of certainty so as to minimize the risk of tube failure in an externally fired reactor.

This need has been recognized previously and there are various examples in the prior art of attempts to overcome the problems outlined above.

The crushing of catalysts by radial forces due to wide temperature cycles in tubular reactors, such as steam reforming reactors, has been recognized in U.S. Pat. No. 4,203,950 (Sederquist). In this document it is proposed that the catalyst should be arranged in an annulus with at least one wall being flexible.

In U.S. Pat. No. 5,718,881 (Sederquist et al.) a steam reformer has segmented reaction zones with individual supports for different temperature zones, the volume of the segments of catalyst being inversely proportional to the temperature of the various zones in the reformer.

The use of flexible louvered screens to accommodate particle movement is proposed in U.S. Pat. No. 3,818,667 (Wagner). Louvers are also proposed in a catalytic converter for catalytically treating the exhaust gases from an internal combustion engine in U.S. Pat. No. 4,063,900 (Mita et al.), and in U.S. Pat. No. 4,052,166 (Mita et al.).

It is proposed in U.S. Pat. No. 3,838,977 (Warren) to use springs or bellows in a catalytic muffler to control bed expansion and contraction so as to maintain a compacted non-fluidised or lifted bed. Spring loading to maintain a bed of carbon granules tightly packed within a fuel vapour storage canister housing is described in U.S. Pat. No. 5,098,453 (Turner et al.).

A ratchet device to follow the decrease in volume of a bed but restrain back-movement of an upper perforated retaining plate is proposed in U.S. Pat. No. 3,628,314 (McCarthy et al.). Similar devices are described in U.S. Pat. No. 4,489,549 (Kasabian), in U.S. Pat. No. 4,505,105 (Ness), and in U.S. Pat. No. 4,554,784 (Weigand et al.).

Pneumatic sleeves inside a catalyst bed to restrain movement of the particulate material are proposed in U.S. Pat. No. 5,118,331 (Garrett et al.), in U.S. Pat. No. 4,997,465 (Stanford), in U.S. Pat. No. 4,029,486 (Frantz), and in U.S. Pat. No. 4,336,042 (Frantz et al.).

However, these prior art proposals are elaborate and do not solve satisfactorily the problem of crushing of particulate catalysts which can be caused by repeated temperature cycling of a reactor tube.

Catalysts are usually passed over a screen to remove dust and broken pieces either before shipment and/or before loading into a reactor. Such removal of dust and broken pieces of catalyst is desirable in order to minimize the pressure drop across the reactor caused by the catalyst bed. This screening step constitutes a costly procedure both in terms of finance and time. Once loaded, catalyst particles usually cannot be re-arranged and the packed density only tends to increase.

The loading of catalysts can be achieved by a number of methods to reduce breakage and damage caused by free fall loading. For example, "sock" loading can be used in which the catalyst is put into long "socks", usually made of fabric, which are folded or closed at one end with a releasable closure or tie which can be pulled to release catalyst when the sock is in position. Another method, which is more suitable for use in forming beds in vessels of large diameter, for example from about 0.75 m to about 4 m or more in diameter, than for loading tubes of diameter less than about 25 cm, is so-called "dense" loading in which the catalyst is fed through a spinning distributor so as to lay down consecutive level layers rather than mounds of dumped catalyst. A third method, which is suitable for loading vertical tubes, utilizes wire devices or wires in tubes which reduce falling velocities. One option is to utilize one or more spirals of wire inside the tube so that the catalyst particles bounce their way down the tube and do not undergo free fall over the full height of the tube. As the tube is filled, so the wire or wires is or are withdrawn upwardly, optionally with vertical fluctuations. Such devices are proposed, for example, in U.S. Pat. No. 4,077,530 (Fukusen et al.).

A further possibility is to use a line having spaced along its length a series of brush-like members or other damper members and to withdraw the line upwardly as the catalyst particles are fed into the tube, as described in U.S. Pat. No. 5,247,970 (Ryntveit et al.).

"Sock" loading can also be carried out semi-continuously in large diameter vessels with a funnel and a filled fabric or solid tube which is moved and raised to release the catalyst with frequent leveling of the catalyst.

Each method of loading produces fixed beds with different bulk densities. The density differences can be quite marked; for example, with cylindrical particulate materials or extrudates the "dense" loaded density can be as much as about 18% greater than the corresponding "sock" loaded density due to the particles being laid generally horizontally and parallel to each other in the "dense" method rather than at random following "sock" removal.

In some applications it is desirable to maximize the amount of catalyst loaded, despite increased pressure drop through the fixed bed, in which case "dense" loading or loading into liquid may be used and/or the tubes may be vibrated.

U.S. Pat. No. 5,892,108 (Shiotani et al.) proposes a method for packing a catalyst for use in gas phase catalytic oxidation of propylene, iso-butylene, t-butyl alcohol or methyl t-butyl ether with molecular oxygen to synthesise an unsaturated aldehyde and an unsaturated carboxylic acid in which metal Raschig rings are used as auxiliary packing material.

In U.S. Pat. No. 5,877,331 (Mummey et al.) there is described the use of a purge gas to remove fines from a catalytic reactor for the production of maleic anhydride which contains catalyst bodies. In this procedure the purging gas, such as air, is passed through the catalyst bed at a linear flow velocity sufficient to fluidise the catalyst fines but insufficient to fluidise the catalyst bodies. At column 15 lines 16 to 18 it is said:

"In order to prevent fluidization or expansion of the catalyst bed during further operation of the reactors, and in particular to prevent the catalyst bodies in the fixed catalyst bed from abrading against one another or against the tube walls, a restraining bed comprising discrete bodies of a material substantially denser than the catalyst was placed on top of the column of catalyst in each tube of the reactors."

It is also taught that this upflow removes undesirable fine particles which, if left in the densely packed vessel, may contribute to plugging of the bed.

In U.S. Pat. No. 4,051,019 (Johnson) there is taught a method for loading finely divided particulate matter into a vessel for the purpose of increasing the packing density by introducing a fluid medium counter-current to the downward flow of the finely divided particulate matter at a velocity selected to maximize the apparent bulk density of the particulate matter in the vessel. It is taught that this method also provides a method of removing undesirable fine particles which, if left in the densely packed vessel, might contribute to plugging of the bed.

Vibrating tubes with air or electrically driven vibrators and/or striking with leather-faced hammers is described in the afore-mentioned reference book by Twigg at page 569, the latter being used to further compact the catalyst in those tubes showing low pressure drop in multi-tube applications, in order to achieve equal pressure drops in each tube.

An upflow tubular steam reformer is described in U.S. Pat. No. 3,990,858 (O'Sullivan et al.). In this proposal fluidisation of the particulate material in the catalyst tubes is prevented by providing a weighted conically shaped hollow member which rests on top of the bed of particulate material. This conically shaped hollow member is provided with elongated slots whereby fluid exiting from the bed flows into the interior of the hollow member, through the slots and into the tube outlet.

There is a need to obviate in a simple and reliable way the problems caused by crushing or attrition of particulate materials, such as catalysts, desiccants or adsorbents, which are subjected to cycling between high and low temperatures in vessels, particularly vessels made of relatively high thermal expansion materials, such as steel or other metals or alloys. There is also a need to provide a method of operating a catalytic reactor in which the pressure drop across a catalyst bed can be reliably minimized in operation. In addition there exists a need for a method of loading a tubular reactor with a particulate material, e.g. a particulate catalyst, in which the presence of "fines" can be substantially avoided in the catalyst tube. Furthermore there exists a need for a method of operating a reactor containing a charge of a particulate material in which any "fines" which may be formed during the course of extended operation of the reactor can be removed simply from the reactor without having to discharge the charge of particulate solid from the reactor. There is also a need for operating a tubular reactor in which the position of the top of the bed of catalyst or other particulate material in the or each tube is known with certainty.

3. SUMMARY OF THE INVENTION

The present invention accordingly seeks to provide a novel process for effecting contact between an elastic fluid, such as a gas or vapour, and a particulate solid under conditions which include use of cycling between elevated temperatures and ambient or near ambient temperature but under which crushing of the solid particles is minimized. It further seeks to provide an improved process in which a gas or vapour is contacted with a particulate solid, such as a catalyst, desiccant or adsorbent, which is subjected to elevated temperatures of several hundreds of degrees Centigrade and then cooled without subjecting the particulate solid to undue mechanical stresses. In addition, the present invention seeks to provide a process for contacting a gas or vapour with a particulate solid in a tube at elevated temperatures under conditions which minimize imposition of crushing forces on the solid, particularly during cooling of the tube, and which facilitate removal of fragments of the particulate solid formed by attrition of the particles of catalyst or other solid so as substantially to obviate any significant increase of pressure drop. Furthermore the invention seeks to provide a new and improved method of packing a catalyst bed. Yet another objective of the present invention is to provide a method of operating a catalytic reactor tube packed with catalyst particles wherein the position of the top of the catalyst bed is known with certainty despite the use of elevated temperatures which cause the reactor tube to expand both longitudinally and radially. The invention further seeks to provide a method of operating a catalytic reactor, more particularly a tubular reactor in which a gaseous or vaporous phase is contacted with a particulate catalyst, so that the pressure drop across the catalyst bed is minimized. It also seeks to provide a method of loading a tubular reactor with a particulate material, such as a particulate catalyst, in which the production of undersized "fines" particles is substantially obviated and in which any such "fines" particles can be removed from the catalyst bed without first discharging the catalyst from the reactor.

According to one aspect of the present invention there is provided a process in which an elastic fluid is contacted with a particulate solid, which process comprises the steps of:
(a) providing a substantially vertical elongate tubular containment zone containing a charge of the particulate solid, the volume of the containment zone being greater than the settled volume of the charge of particulate solid;
(b) providing upper retainer means mounted at the upper end of the containment zone, the upper retainer means being permeable to the fluid but adapted to retain particulate solid in the containment zone, and follower means movably mounted in the containment zone beneath the charge of particulate solid for movement upwardly from the lower end of the containment zone upon upward flow of elastic fluid through the containment zone at a rate beyond a threshold rate; and
(c) causing the elastic fluid to flow upwardly through the containment zone at a rate which is sufficient to cause particulate solid to rise up towards the upper end of the containment zone and form a cushion of particulate solid against the underside of the upper retainer means and which is in excess of the threshold rate so as to cause the follower means to move upwardly until it abuts against the underside of the cushion of particulate solid.

The invention further provides an apparatus for effecting contact of an elastic fluid with a particulate solid comprising:
(a) reactor means defining a substantially vertical elongate tubular containment zone for containing a charge of the particulate solid, the volume of the containment zone being greater than the settled volume of the charge of the particulate solid;
(b) upper retainer means mounted at the upper end of the containment zone, the upper retainer means being permeable to the fluid but adapted to retain particulate solid in the containment zone; and
(c) follower means movably mounted in the containment zone beneath the charge of particulate solid for movement upwardly from the lower end of the containment zone upon upward flow of elastic fluid through the containment zone at a rate beyond a threshold rate;

whereby upon causing the elastic fluid to flow upwardly through the containment zone at a rate which is sufficient to cause particulate solid to rise up towards the upper end of the containment zone and form a cushion of particulate solid against the underside of the upper retainer means and which is in excess of the threshold rate the follower means moves upwardly until it abuts against the underside of the cushion of particulate solid.

The elastic fluid may comprise a gaseous or vaporous medium.

The upper retainer means is permeable to the elastic fluid but adapted to retain undamaged particles of the particular solid in the containment zone. It may comprise a screen of substantially parallel bars, rods or wires, or a wire mesh or other perforate form of retainer, such as a plate formed with numerous apertures.

The follower means is desirably designed so that there is a gap or gaps through and/or around it for upward flow of elastic fluid therethrough. Moreover the lower end of the containment zone is desirably designed so that, when there is no upward flow of elastic fluid through the containment zone, yet there is a gap or gaps for elastic fluid to flow upwardly through or around the follower means when such upward flow commences but remains below the threshold rate. Thus the follower means typically includes a piston portion which is a loose fit in the containment zone so that fluid can pass up through an annular gap surrounding the piston portion. This piston portion can be disposed at or towards the lower end of the follower means, at or towards the upper end of the follower means, or intermediate the upper and lower ends of the follower means. One of the functions of the follower means is to support the charge of particulate solid when any upward flow of fluid is insufficient to cause particulate solid to rise upwardly in the containment zone to form a cushion against the underside of the upper retainer means. If the piston portion is at or near the upper end of the follower means, then the piston portion can perform this function; if not, then the follower means preferably includes, at or towards its upper end, support means for supporting the charge of particulate solid when any upward flow of fluid is insufficient to cause particulate solid to rise upwardly in the containment zone to form a cushion of particulate solid against the underside of the upper retainer means, for example a series of concentric rings spaced one from another so that the gaps between adjacent pairs of rings are insufficient to allow a particle of predetermined size of the particulate solid to pass therethrough. Such gaps also assist in distributing the flow of upflowing elastic fluid more uniformly across the cross-section of the containment zone.

Instead of using concentric rings it is alternatively possible to use a mesh arrangement to provide support for the charge of particulate solid when any upward flow of elastic fluid is insufficient to cause particulate solid to rise upwardly in the containment zone to form a cushion of particulate solid against the underside of the upper retainer means.

The follower means should further be designed so that, despite the annular gap around the piston portion, the follower means cannot tilt sufficiently from a vertical position to become jammed against the walls of the containment zone. In one design this is achieved by providing the piston portion with a series of substantially vertical plates radiating from a vertical axis, for example three vertical plates in a Y-section arrangement, the plates being arranged vertically with their planes at angles of approximately 120° to one another around a substantially vertical axis of course more than three plates can be used, if desired, for example four plates arranged vertically in an x-section at 90° to one another around a substantially vertical axis.

Alternatively, the piston portion can be provided with a central vertical rod with one or more spider sets formed by three or more rods or bars radiating from the central vertical rod, for example three radiating rods set at an angle of approximately 120° to one another and positioned so as to prevent the follower means from tilting a significant amount as it moves within the containment zone and hence from jamming against the walls of the containment zone. In this way the follower means can allow elastic fluid to pass freely at all times around it in either the upward or downward direction, while ensuring that, as the rate of upward flow of elastic fluid is increased to a rate beyond the threshold rate, the follower means lifts smoothly off from its position at the bottom end of the containment zone and then moves up the containment zone until it abuts against the underside of the cushion of particulate solid.

When the elastic fluid flows upwardly at a low flow rate through the containment zone, the follower means remains at the lower end of the containment zone with the particulate solid supported on it in the form of a bed. As the upward flow rate increases, the particles of the particulate solid become fluidised at the upper end of the bed. Upon still further increase of the upward flow rate, the proportion of the bed that is fluidised increases until particles begin to rise up the containment zone and form a cushion of particles against the underside of the upper retainer means. When the upward flow rate is sufficient for substantially all of the particles to have lifted, some of the particles on the lower side of the cushion of particles tend to fall off and then be carried up again. At an upward flow rate beyond the threshold flow rate, the follower means is lifted and comes to abut against the underside of the cushion of particles thereby holding the cushion of particles in place and preventing particles from falling off the cushion of particles while the follower means remains in place against the underside of the cushion of particles.

Figure 7:
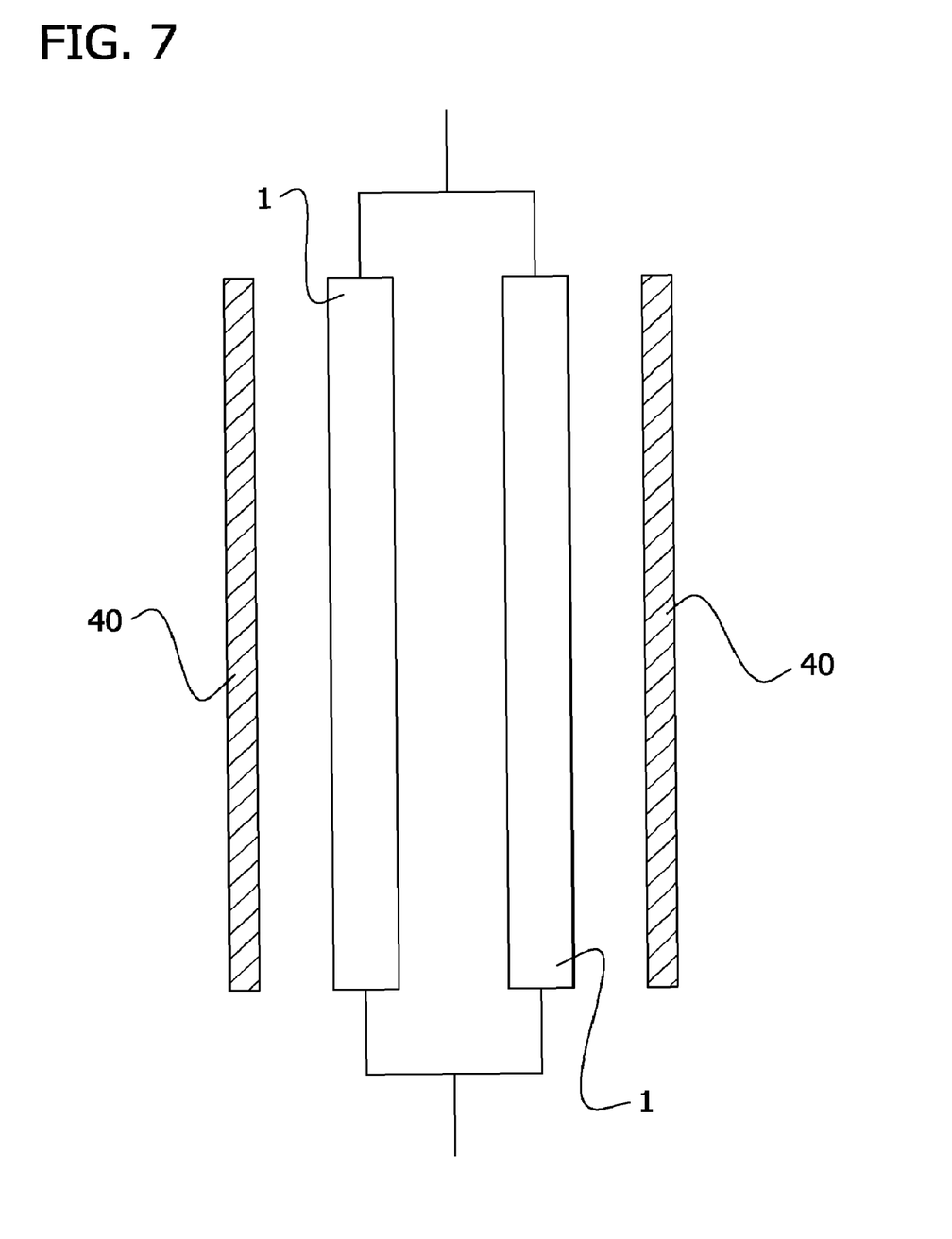
FIG. 7 depicts a plurality of elongate containment zones connected in parallel.

The elongate containment zone may be one of a plurality of elongate containment zones connected in parallel, for example it may be a catalyst tube 1 mounted in the furnace 40 of a steam reformer (FIG. 7).

Preferably at least part of the containment zone is of substantially uniform horizontal cross-section. More preferably the containment zone is of substantially uniform horizontal cross-section throughout at least a major part of its height and even more preferably throughout substantially all of its height.

The follower means is adapted to rise upwardly up the containment zone when the upward flow rate of elastic fluid is greater than the threshold flow rate until it abuts against the cushion of particulate solid. Thus at least that part of the containment zone in which the follower means moves should desirably be of uniform horizontal cross section. For example it may comprise a tube of substantially circular cross section.

In a preferred embodiment the containment zone comprises a tube which has a length:diameter ratio of from about 50:1 to about 1000:1, more preferably from about 100:1 to about 750:1. Normally such a tube has an internal diameter of about 6 inches (about 15.2 cm) or less, preferably an internal diameter of about 2 inches (about 5.08 cm) or less, e.g. a tube having an internal diameter of from about 1 inch (about 2.54 cm) to about 2 inches (about 5.08 cm).

In many cases it is possible to design the containment zone so that the distance through which the follower means rises up the containment zone in operation is at most only a few inches, for example from about 1 inch (about 2.54 cm) up to about 10 inches (about 25.40 cm), preferably from about 2 inches (about 5.08 cm) to about 5 inches (about 12.70 cm), e.g. about 3 inches (about 7.62 cm).

Although it will frequently be preferred for the containment zone to be of substantially uniform cross-section throughout its height, it is alternatively possible for a lower portion of the containment zone in which the follower means moves in operation to have a smaller area of cross-section than an upper part of the containment zone. Hence the containment zone can comprise a lower tubular portion of relatively small diameter attached to the bottom of a tube of larger diameter. In this case, while the narrower lower portion of the containment zone in which the follower means moves in operation requires to be machined to a relatively close tolerance, the transverse dimensions of the upper portion of the containment zone do not have to be so carefully controlled. A further advantage in such an arrangement is that the gap between the follower means and the walls of the lower portion of the containment zone can be larger than if the follower means is arranged to slide in a larger tube. Again this factor reduces the need for careful machining of the inside of that part of the containment zone in which the follower means moves.

It will usually be preferred that the follower means is arranged to block passage of elastic fluid up or down the containment zone but permit upward passage of elastic fluid through a clearance gap between the internal surface of the containment zone and the follower means, the clearance gap providing a clearance less than the smallest dimension of a non-fragmented particle of the particulate solid. Hence the follower means may comprise a closed lower end portion for defining the clearance gap and an upper portion provided with elastic fluid passing means. Such elastic fluid passing means may comprise a plurality of substantially concentric rings spaced one from another, the clearance between adjacent rings being less than the smallest dimension of a non-fragmented particle of the particulate solid. Alternatively the elastic fluid passing means may comprise a perforate baffle member whose perforations are smaller the smallest dimension of a non-fragmented particle of the particulate solid.

Figure 8:
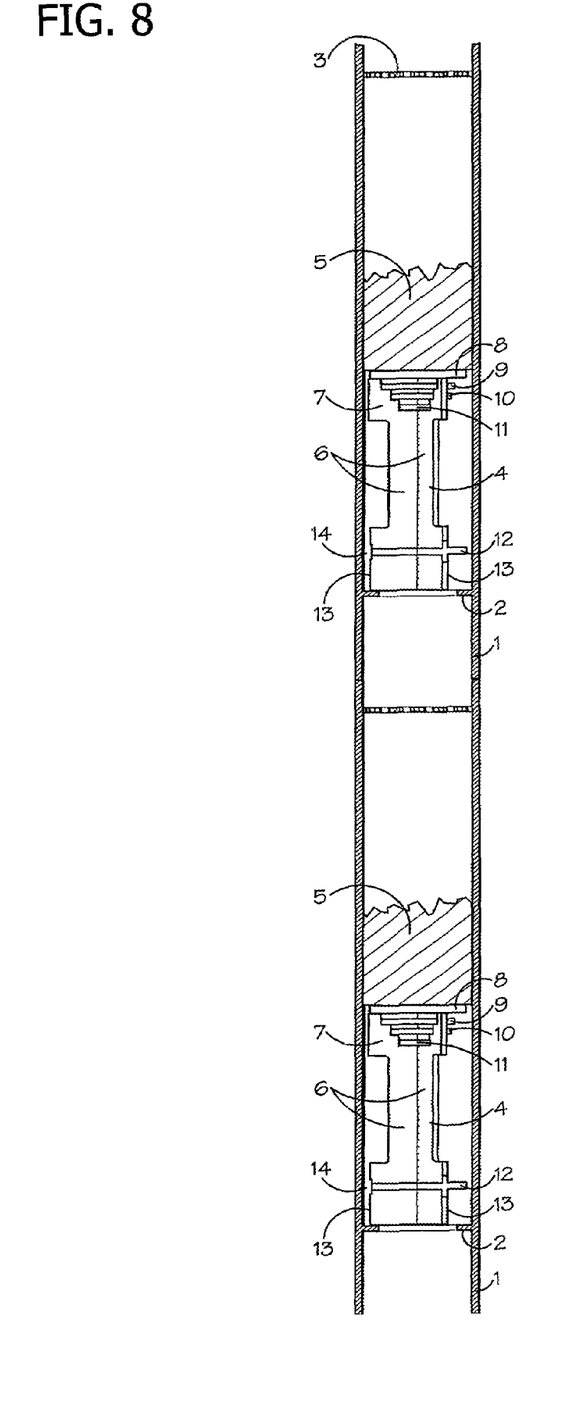
FIG. 8 depicts separation of a plurality of types of particulate solids by respective follower means.

The containment zone may contain a plurality of types of particulate solid, in which case each type can be separated from an adjacent type by means of a respective follower means (FIG. 8).

Typically the particulate solid has at least one dimension less than about 10 mm, e.g. about 6 mm. The particulate solid may be substantially spherical in shape and have, for example, a diameter of from about 2 mm to about 10 mm, e.g. about 6 mm. However, other shapes of particulate solid can alternatively be used but the use of shapes which can easily form bridges should be avoided. Thus other shapes which can be used include rings, saddles, pellets, cylindrical extrudates, trilobates, quadrilobates, or the like.

Examples of suitable particulate solids include catalysts, desiccants and adsorbents.

One method of loading the particulate solid into the containment zone involves loading via the top of the containment zone against a gentle upflow stream of elastic fluid at a rate less than that required to lift fully any already charged particulate solid (or to move the follower means upwardly) but such that the particulate solid does not fall freely under gravity. In this way the danger of damage to the particulate solid can be significantly reduced or substantially eliminated.

Any other method of loading, e.g. "sock" loading, can, however, be used. Other techniques that can be used include the use of wire devices, the use of devices as described in U.S. Pat. No. 5,247,970 (Ryntveit et al.), or the like.

After initial loading of the particulate solid and optionally mounting in position the upper retainer means, the pressure drop across the containment zone can be measured in upflow or downflow mode, whereupon, after applying an upflow stream of elastic fluid to the particulate solid with the upper retainer means in position, the settled volume of particulate solid in the containment zone and/or the pressure drop across the containment zone can be checked, particulate solid being added to, or removed from, the containment zone if the settled volume of particulate solid in the containment zone does not correspond to a predetermined value and/or if the pressure drop across the containment zone is not within the desired range. Hence in a preferred procedure, after initial loading of the particulate solid, the pressure drop across the containment zone is measured in a measurement step. Then particulate solid can be added to or removed from the containment zone if the pressure drop measured does not conform to a predetermined value. Alternatively, or in addition, after initial loading of the particulate solid the settled volume of particulate solid in the containment zone can be measured in a measurement step, whereafter particulate solid may be added to or removed from the containment zone if the settled volume of particulate solid in the containment zone does not conform to a predetermined value. In either case, after initial loading of the particulate solid but prior to the measurement step, elastic fluid can be caused to flow upwardly through the containment zone at a rate in excess of the threshold rate so as to cause the particulate solid to form a cushion of particulate solid against the underside of the upper retainer and so as to cause the follower means to rise up the containment zone until it abuts against the underside of the cushion of particulate solid, thereafter the upward flow of elastic fluid being reduced or discontinued so as to permit formation of a settled bed of particulate solid.

In one particularly preferred process according to the invention the particulate solid is a catalyst effective for catalysing a desired chemical reaction, e.g. steam reforming, and an elastic fluid comprising a reaction feed mixture capable of undergoing the desired chemical reaction is passed in upflow mode through the containment zone while the containment zone is maintained under operating conditions effective for carrying out the desired chemical reaction. In an alternative process according to the invention the particulate solid is a catalyst effective for catalysing a desired chemical reaction, and an elastic fluid comprising a reaction feed mixture capable of undergoing the desired chemical reaction is passed in downflow mode through the containment zone while the containment zone is maintained under operating conditions effective for carrying out the desired chemical reaction.

In the process of the invention the containment zone and the particulate solid can be subjected to an elevated temperature, for example a temperature of at least about 500° C. For example, the desired chemical reaction may be a partial oxidation reaction, in which case the elastic fluid comprises a partial oxidation feed mixture, the particulate solid is a partial oxidation catalyst, and the temperature of the containment zone and the partial oxidation catalyst is maintained by the partial oxidation reaction. Alternatively the desired chemical reaction may be a steam reforming reaction, in which case the elastic fluid comprises a steam reforming feed mixture, the particulate solid is a steam reforming catalyst, and the temperature of the containment zone and the steam reforming catalyst is maintained by hot combustion gases external to the containment zone.

The invention further provides a method of loading a particulate solid into a substantially vertical tube in readiness for conducting a method in which an elastic fluid is contacted with the particulate solid, which method comprises the steps of:

(a) providing a substantially vertical elongate tubular reactor having an elongate containment zone for containing a charge of a particulate solid;

(b) providing at the lower end of the containment zone follower means movably mounted in the containment zone for movement upwardly from the lower end of the containment zone upon upward flow of elastic fluid through the containment zone at a rate beyond a threshold rate;

(c) loading a predetermined charge of the particulate solid into the containment zone on top of the follower means, the settled volume of the particulate solid being less than the volume of the containment zone;

(d) mounting at the upper end of the containment zone upper retainer means permeable to the fluid but adapted to retain particulate solid in the containment zone; and (e) causing an elastic fluid to flow upwardly through the containment zone at a rate which is sufficient to cause particulate solid to rise up towards the upper end of the containment zone and form a cushion of particulate solid against the underside of the upper retainer means and which is in excess of the threshold rate so as to cause the follower means to move upwardly until it abuts against the underside of the cushion of particulate solid. In such a method said particulate solid may be loaded via the top of said containment zone against an upflow stream of elastic fluid at a rate less than that required to lift fully said particulate solid but such that said particulate solid does not fall freely under gravity. Preferably, after applying an upflow stream of elastic fluid to said particulate solid, the settled volume of particulate solid in the containment zone is checked. Particulate solid can be added to or removed from the containment zone if the settled volume of particulate solid in the containment zone does not conform to a predetermined value.

In a particularly preferred loading method the upward flow of elastic fluid is maintained in step (e) for a period and at a rate sufficient to cause substantially all particles which are smaller than a predetermined design particle size and are sufficiently small to pass through the upper retainer means to pass through the upper retainer means.

5. DETAILED DESCRIPTION OF THE PREFERRED EMBODIMENTS

Figure 1:
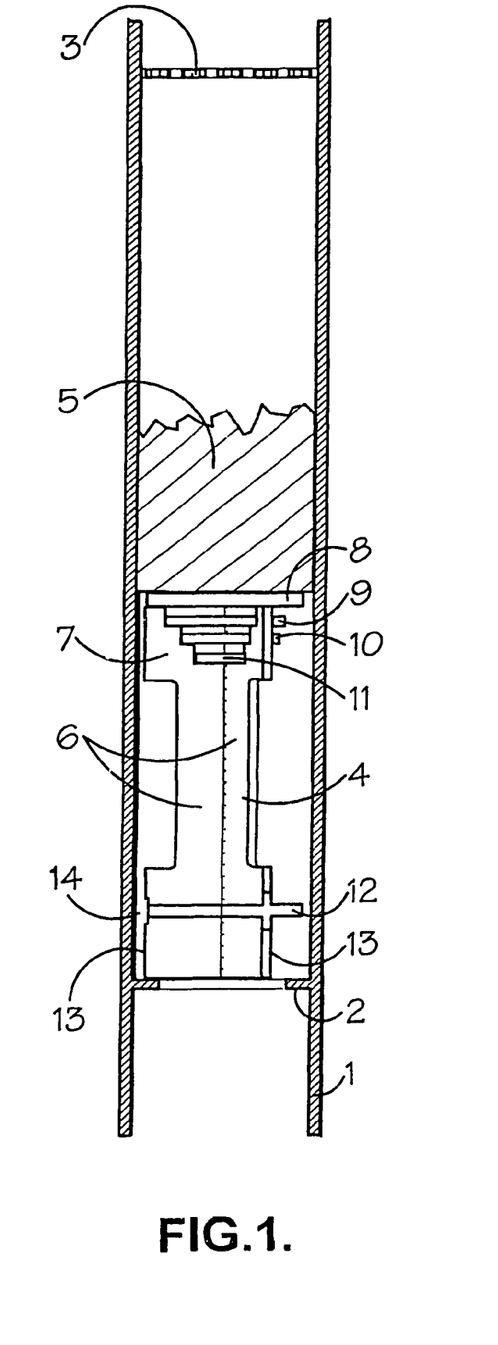
FIG. 1 is a semi-diagrammatic side view of a vertical reactor tube having a catalyst follower therein with no upward gas flow.

Referring to FIG. 1 of the drawings, there is shown a vertical reactor tube 1 for carrying out a gas phase or vapour phase reaction, such as a steam reforming process. This process can be operated in upflow or downflow mode, as desired. However, for reasons which will be further explained below, upflow mode is preferred in the practice of the present invention.

Tube 1 is circular in cross section and has an internal diameter of about 2 inches (about 5.08 cm) and is provided with an internal annular ledge 2, or with a removable support with a central vertical aperture, and with an upper perforate retainer 3. It can be made of any suitable material that is substantially inert under the reaction conditions to be used. For example, it can be a stainless steel or alloy tube or a mild steel tube, depending upon the nature of the reaction to be carried out and the reaction pressure.

Although reactor tube 1 for convenience usually has a circular cross section, tubes of other cross sections, such as elliptical, hexagonal, or square cross section may be used, if desired.

The length of reactor tube 1 is a multiple (which can be either a whole number multiple, e.g. 100×, or a fractional number multiple, e.g. 37.954×) of the diameter or other transverse dimension of the reactor tube 1. Although reactor tube 1 as illustrated is relatively short, it will be appreciated by those skilled in the art that reactor tube 1 can be of any convenient length. For example, reactor tube 1 can be about 6 feet (about 182.88 cm) long or more, e.g. up to about 30 feet (about 914.40 cm) or 45 feet (about 1371.60 cm) or more, if desired.

When there is no upward flow of gas or vapour, ledge 2 supports a catalyst follower 4 on top of which is disposed a charge 5 of a particulate catalyst. The settled volume of the charge 5 of particulate catalyst, whether this is densely packed or loosely packed, is less than the available volume between the top of the catalyst follower 4 and the upper perforate retainer 3.

The catalyst particles may be of any desired size or shape but are typically substantially spherical. Typically the catalyst particles have no dimension which is smaller than about 3 mm. They may be substantially spherical particles which have, for example, a diameter of about 6 mm. However, the particles may have any other desired shape, for example, cylinders (optionally with one or more passages formed therein), cylindrical extrudates, or trilobe or quadrilobe extrudates, so long as the shape of the particles is not conducive to the formation of bridges. The catalyst particles are sufficiently large not to pass through any annular gap between catalyst follower 4 and the internal wall of reactor tube 1 nor to pass through upper perforate retainer 3.

The upper perforate retainer 3 is intended to prevent passage of undamaged catalyst particles upwardly beyond upper perforate retainer 3. It will, however, allow dust or small fragments of abraded catalyst to pass upwardly therethrough. It may consist of or include a wire gauze or mesh of appropriate mesh size.

Catalyst follower 4 is made from a suitable material, such as stainless steel, and comprises three plates 6 welded together axially and symmetrically so as to form a Y-section central portion with the plates 6 set at 120° to one another about a vertical axis. The radially outer edges of plates 6 are closely spaced from the internal wall of reactor tube 1 and help to maintain catalyst follower 4 in an upright position and guide it in its movement up and down the reactor tube 1 as further described below.

Figure 2:
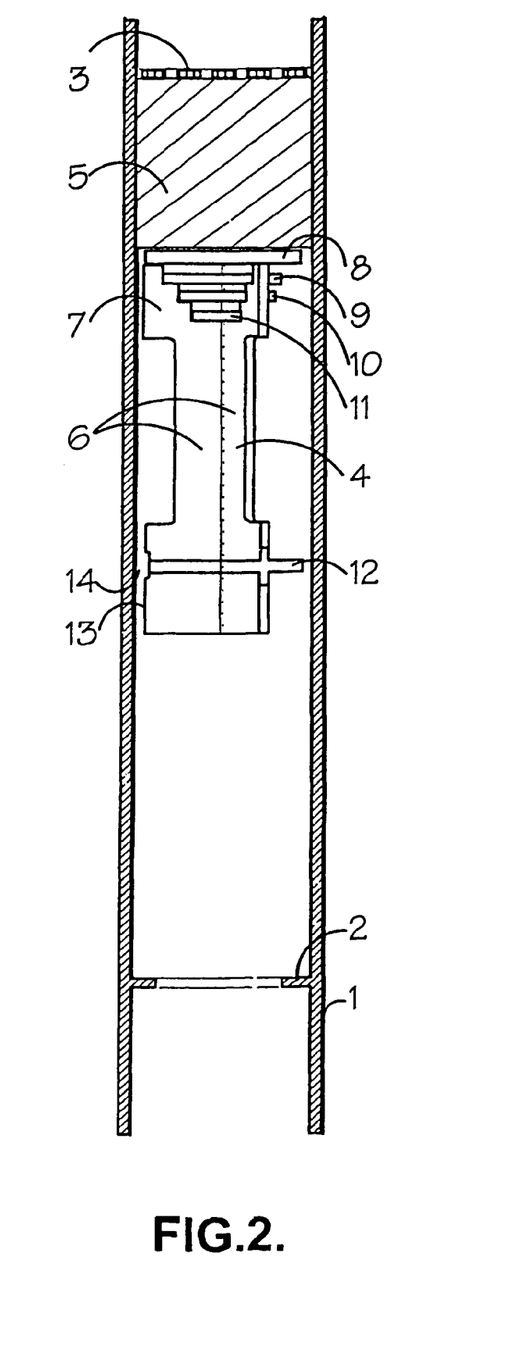
FIG. 2 is a side view of the vertical reactor tube of FIG. 1 with an upward gas flow at a rate in excess of a threshold gas flow rate.
Figure 3:
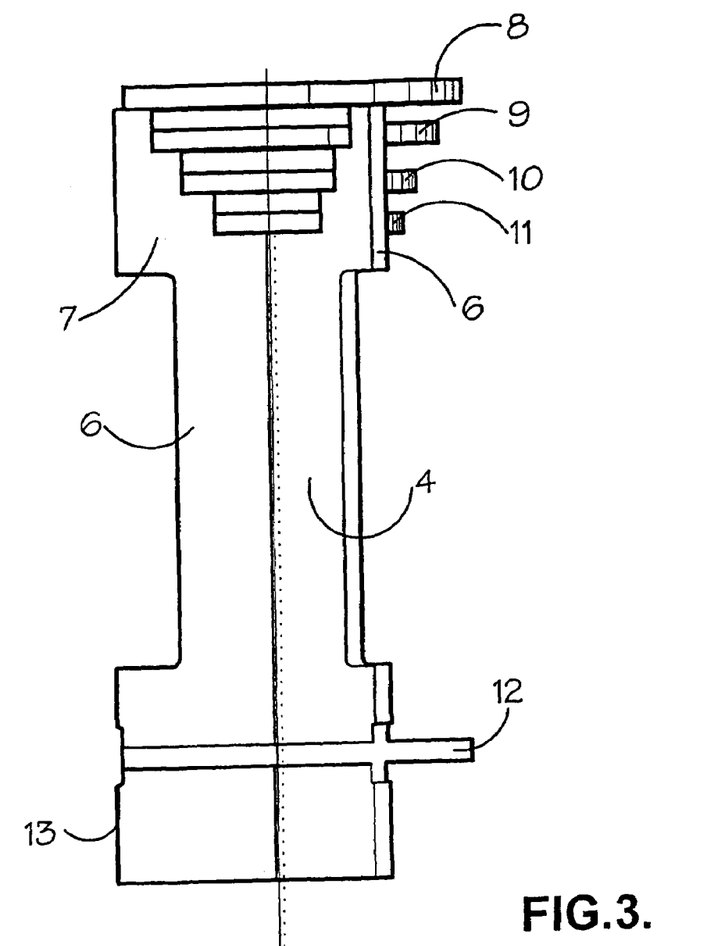
FIG. 3 is a side view of the catalyst follower of FIGS. 1 and 2 on an enlarged scale.

As can be seen from FIGS. 1 and 2, and more clearly from FIG. 3, the upper part 7 of each plate has a stepped profile and annular rings 8, 9, 10, and 11 are welded to this stepped profile. The clearance between the annular rings 8, 9, 10, and 11 is less than the average smallest dimension of the catalyst particles and the lateral dimensions of the rings are so chosen that the catalyst particles cannot drop down through catalyst follower 4 but are retained on the upper side thereof. Near the lower end of catalyst follower 4 the plates 6 are welded to a disc 12 below which there are also welded lower plates 13.

Figure 4:
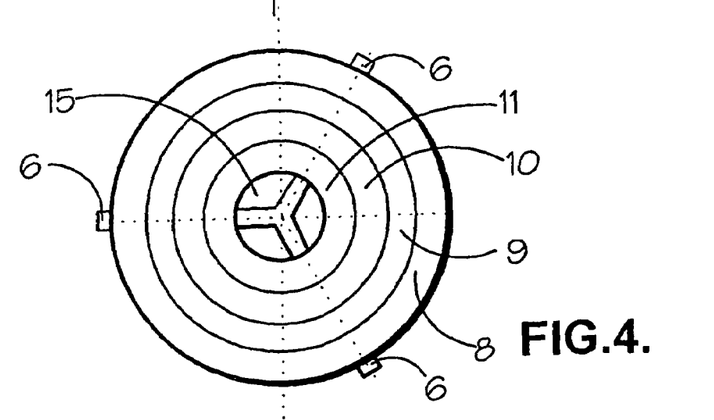
FIG. 4 is a top plan view of the catalyst follower of FIG. 3.

There is an annular gap 14 around disc 12 to allow upward passage of gas or vapour. In addition there is a central aperture 15 at the top end of catalyst follower 4, as can be seen in FIG. 4. However, when gas or vapour passes up reactor tube 1 at a flow rate in excess of a threshold flow rate, disc 12 acts as a loose piston and so catalyst follower 4 rises in reactor tube 1. The weight of the catalyst follower 4 is so selected, and the size and shape of the catalyst follower 4 are so chosen, that the upward lifting forces due to the upflowing gas or vapour at such a flow rate cause catalyst follower 4 to float up the tube 1 thereby sweeping any non-fluidised particulate material before it and compressing the cushion of particles 5 against the fixed upper perforate retainer 3.

It will be seen that catalyst follower 4 includes a lower spacer section constituted by plates 13 which serves to hold the piston part formed by disc 12 away from the ledge 2 mounted in tube 1 when there is no upflow of elastic fluid and when catalyst follower 4 is supported on ledge 2. This results in gas or vapour being able, at all times, to pass freely in upflow or in downflow past this piston part. Disc 12 allows smooth lift of the catalyst follower 4 in upflow operation. The weight of catalyst follower 4 is selected so that, at the desired operating upflow gas rate, the uplift force caused by the pressure loss across the annular gap 14 between the disc 12 and the inside wall of reactor tube 1 is greater than the gravitational pull of the total mass of the catalyst follower 4.

FIG. 2 illustrates the reactor tube 1 when gas or vapour is flowing up the reactor tube 1 at a flow rate in excess of a threshold flow rate. The catalyst particles have lifted to form a cushion of catalyst particles 5 abutting against the underside of upper perforate retainer 3. In addition catalyst follower 4 has also lifted and is itself pressing against the underside of the cushion of catalyst particles 5.

By varying the size of the portions cut out of the radially outer sides of plates 6, it is possible to alter the weight of the catalyst follower 4. It accordingly becomes possible to vary the threshold flow rate, i.e. the upward flow rate of gas or vapour within a given tube 1 at which the catalyst follower 4 will lift from ledge 2.

If desired, concentric rings 8, 9, 10, and 11 can be replaced by a gauze or lattice arrangement.

Figures 5, 6:
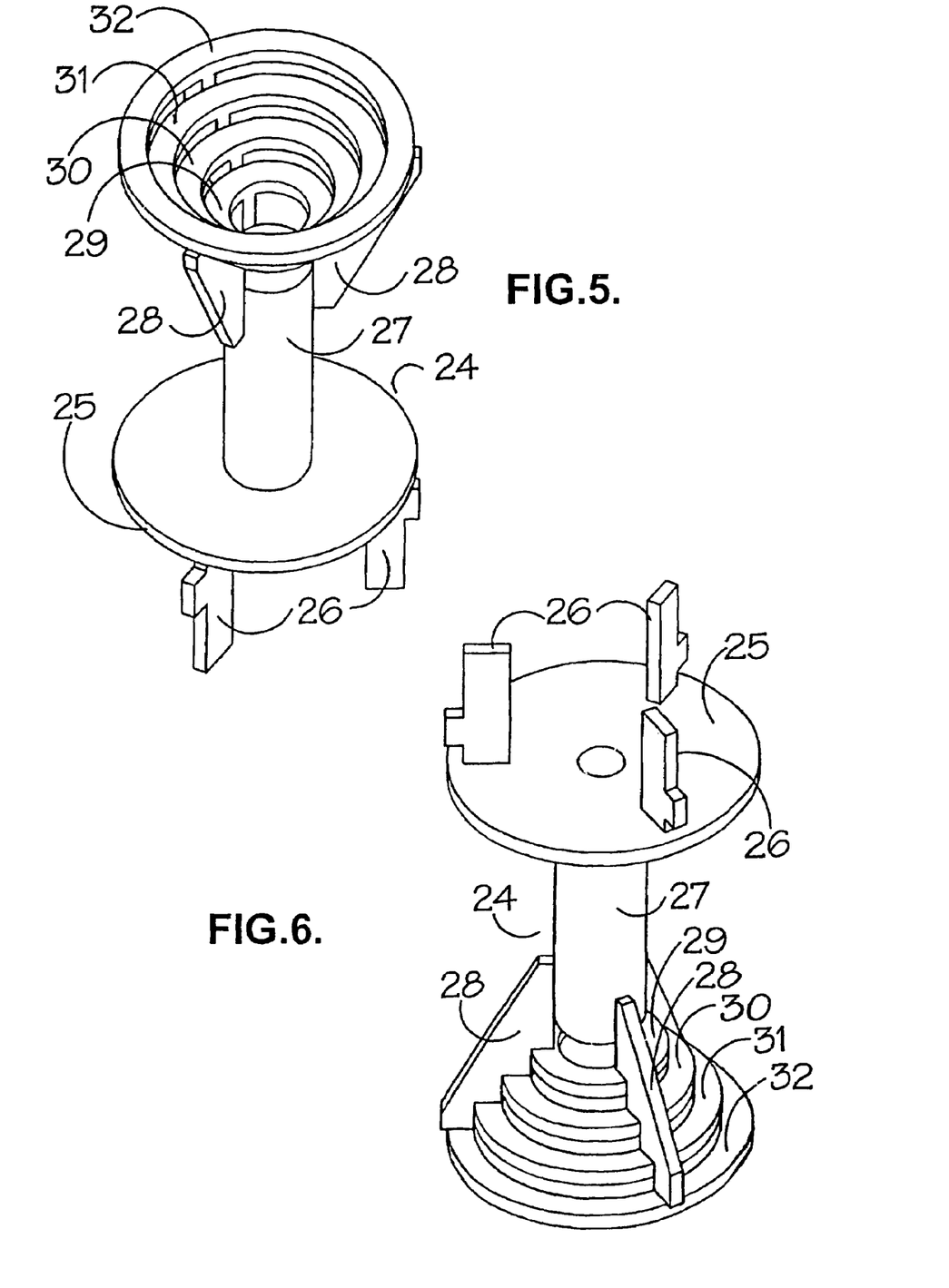
FIG. 5 is a perspective view from above of an alternative catalyst follower.
FIG. 6 is a perspective view from below of the catalyst follower of FIG. 5.

An alternative form of catalyst follower 24 is illustrated in FIGS. 5 and 6. This is cast from a suitable alloy. This comprises a bottom disc 25 below which are three spacer elements 26 that are set at 120° to one another and that serve to support catalyst follower 24 on the ledge 2 when there is no upflow of gas through reactor tube 1. The gaps between spacer elements 26 and the annular gap around bottom disc 25 serve to permit gas to flow upwards around catalyst follower 24 at low gas velocities and to permit catalysts follower 24 to lift off from ledge 2 when the upward gas flow rate exceeds the threshold rate. Above disc 25 is a rod portion 27 from whose upper end project three stepped flanges 28, which are radially spaced one from another around the axis of the rod portion 27 by an angle of 120°. Secured to flanges 28 are a series of rings 29, 30, 31 and 32, the spacing between adjacent rings being less than the smallest dimension of an undamaged catalyst particle. In this way catalyst particles cannot pass down the tube below catalyst follower 24 whereas gas or other elastic fluid can pass up the tube at flow rates both below and above the threshold value at which catalyst follower 24 will lift off the ledge 2.

Instead of providing reactor tube 1 with an internal ledge 2, it is expedient to replace the ledge 2 by a number of small inwardly directed projections, for example, 3 or 4 small projections, the spaces between which provide a passage for upward flow of elastic fluid past bottom disc 25. In this case plates 13 or spacer elements 26 would not be required. Alternatively ledge 2 can be replaced by a removable support device, which is formed with a central vertical aperture, so as to enable the reactor tube 1 to be emptied downwardly, if necessary.

The operation of a preferred process using the apparatus of FIGS. 1 to 4 will now be described. The apparatus of FIGS. 5 and 6 can be used in a similar way.

In order to load catalyst particles into tube 1 any suitable method can be used. For example, if the catalyst is sufficiently robust, upper perforate retainer 3 can be removed and the catalyst then carefully poured in until the desired amount has been introduced. Since reactor tube 1 is of relatively small cross section, the catalyst particles tend to collide with the walls of the tube and thus do not ever undergo absolutely free fall. Hence their passage down the reactor tube 1 results in their rattling their way down the tube 1 rather than undergoing free fall. If the catalyst is of a frangible nature, then any of the previously mentioned techniques using wires, wire coils, or the devices of U.S. Pat. No. 5,247,970 (Ryntveit et al.) can be used. Alternatively the "sock" technique can be used, for example.

After loading of the catalyst charge the settled volume of the catalyst can be measured and compared with a design value. If that settled volume is greater than or less than the design value, then some of the catalyst can be removed or more catalyst can be loaded, as appropriate. In addition, before the desired process, e.g. steam reforming or partial oxidation, is brought on line, it will usually be desirable to install the upper perforate retainer 3 and to pass a gas, such as nitrogen, up the tube 1 at a rate in excess of the threshold rate so as to cause the catalyst and the catalyst follower 4 to rise up the tube 1 and form a cushion of catalyst particles immediately under the upper perforate retainer 3. This upflow can be maintained for a sufficient length of time and at a rate to allow substantially all "fines" particles with a particle size small enough to pass through the upper perforate retainer 3 to pass therethrough and be swept away by the gas. This procedure can be repeated as many times as necessary by reducing the gas flow until the catalyst follower 4 and catalyst fall back down the tube, and then increasing the flow of gas again past the threshold rate. Then the pressure drop across the catalyst charge, either in upflow through the cushion of catalyst or in downflow through the settled bed of catalyst can be measured and compared to a design value. If either the settled volume or the pressure drop are not as desired, then the upper perforate retainer 3 can be removed to permit more catalyst to be added or some of the catalyst to be removed, as appropriate, and the procedure repeated until the measurements indicate that the loading of catalyst in tube 1 is considered satisfactory.

If more than one type of catalyst is to be loaded into reactor tube 1, then a further catalyst follower 4 can be added after each type of catalyst has been loaded except after the final type of catalyst has been loaded.

At low upflow rates the gas or vapour flows through the settled bed of catalyst particles. However, as the flow rate increases, so at least some of the catalyst particles will tend to lift, forming initially a partially fluidised bed above a lower static bed of catalyst particles. As the flow rate is increased, more and more of the catalyst particles are fluidised and travel up the reactor tube 1 to form a cushion of catalyst particles against the underside of upper perforate retainer 3. Any dust or under-sized particles will tend to pass through the upper perforate retainer 3 during this procedure. Upon further increase of flow rate, substantially all of the catalyst particles are lifted from on top of catalyst follower 4 into the cushion of catalyst particles with a relatively small number of particles in motion just under the cushion of catalyst particles, these moving particles falling away from the cushion under gravity and then being carried back up again by the upflowing gas or vapour. Eventually, as the flow rate increases still further, the catalyst follower 4 moves upwards until it abuts against the underside of the cushion of catalyst particles, as illustrated in FIG. 2, thereby preventing any further movement of the catalyst particles and thus possible attrition thereof.

During this procedure the upflowing elastic fluid may be an inert gas or a reactant gas required for pre-treatment of the catalyst. For example, in the case of a hydrogenation catalyst, the upflowing elastic fluid during this phase of operation may be a hydrogen-containing gas required for pre-reduction of the catalyst. Pre-treatment can be effected at any appropriate temperature or pressure. Thus pre-treatment can be effected at ambient temperature or at elevated temperature, as appropriate, and can be effected at ambient pressure, at sub-ambient pressure, or at elevated pressure, as need be.

If reactor tube 1 is to be used in upflow mode, then following any necessary pre-treatment of the catalyst particles in the cushion of catalyst particles, the flow of elastic fluid can be switched to the reactant gas or vapour mixture and any necessary adjustment of the temperature or pressure carried out in order to allow an operating campaign to be carried out. For example, if the reactor tube 1 is a tube mounted in the furnace of a steam reformer, it may be heated to a temperature of 500° C. or more, for example to at least about 750° C. up to about 1050° C., and maintained under a pressure of, for example, about 100 psia to about 600 psia (about 698.48 kPa to about 4136.86 kPa). In the course of being heated to the elevated operating temperature, the reactor tube 1 will expand radially and longitudinally and the catalyst, having a lower expansion coefficient, will move to fill the increased space. However, the location of the top of the cushion of catalyst particles will be fixed at all times since the position of the upper catalyst retainer 3 is known and remains fixed, while the bottom of the cushion will move upwards marginally. This fixing of the position of the top of the cushion of catalyst, i.e. the top of the catalyst bed in operation, is of great advantage in multi-tubular reactors, for example, where introduction of heat needs to be precisely located relative to the catalyst, such as in the furnace of a steam reformer, or where the level of a liquid coolant or heating medium outside the tubes needs to be located precisely relative to the catalyst, such as in an exothermic reaction controlled by raising steam from a controlled level of boiling water, for example in Fischer-Tropsch reactions, in hydrogenation reactions, or the like. In addition, it has the added benefit of substantially obviating the problem of tube failure through lack of control of the temperature within or outside a catalyst filled tube.

At the end of an operating campaign, the reactant feed can be switched to an inert gas or to air, as appropriate, either before or after allowing the pressure to return to standby or shutdown pressure conditions, while allowing the reactor tube 1 to cool. Alternatively, if the catalytic reaction is endothermic, the supply of heat to the outside of the tubes can be reduced while maintaining a flow of precess fluid through the reactor tube 1 as it cools. Then the flow rate of elastic fluid can be reduced, thus allowing catalyst follower 4 and catalyst particles 5 to drop back in controlled fashion until catalyst follower 4 again rests on ledge 2 (or on the removable support device, if ledge 2 is replaced by a removable support device, as described above, so as to enable the reactor tube 1 to be cleared downwardly) and catalyst particles return gently to the condition illustrated in FIG. 1 with minimum damage to the catalyst.

On re-start in upflow mode, the catalyst will have been partially remixed. If reactor tube 1 is a tube of a multi-tubular reactor, the catalyst particles will reform a consistent low packing density in all the tubes, while fines and debris will be removed by the gas upflow. Hence the pressure drop across each tube will remain substantially constant throughout the life of the catalyst.

During the cooling operation at the end of an operating campaign in upflow mode, the gas flow can be increased one or more times to recreate the cushion of catalyst particles against the underside of upper perforate retainer 3, whereafter the gas flow can again be reduced in order to prevent the formation, during cooling of the reactor tube 1, of any "bridges" of catalyst particles, which could otherwise lead to a danger of crushing forces being exerted on the catalyst particles by the contracting walls of the reactor tube 1 as it cools.

It is also possible to interrupt an upflow operating campaign by switching the flow of elastic fluid to an inert gas, in the case of an exothermic catalytic reaction, or by reducing the rate of supply of heat to the outside of the reactor tube while maintaining a flow of process fluid through the reactor tube 1 in the case of an endothermic reaction, and then allowing the catalyst particles and catalyst follower 4 to drop by reducing the flow of inert gas or process fluid. The gas flow can then be returned to a value which causes the cushion of catalyst particles to be re-formed. In the course of re-forming the cushion of catalyst particles, any dust or catalyst fragments will tend to pass through the upper perforate retainer 3, thus removing a potential cause of undesired increase of pressure drop across the catalyst cushion. Thereafter the inert gas can be switched back to an upflowing reactant mixture, or the rate of heat supply can be increased, to continue the upflow operating campaign.

If reactor tube 1 is to be used in a downflow mode, then after the cushion of catalyst particles has been formed as shown in FIG. 2 and, if desired any necessary pre-treatment of the catalyst has been effected, the upflow of gas or vapour is reduced and then gradually stopped thereby allowing the catalyst particles to settle out into a condition similar to that shown in FIG. 1. In this condition the catalyst particles have a low packing density in the bed of catalyst particles. In downflow operation, as the reactor tube 1 reaches operating temperature, especially if that operating temperature is over 500° C. (for example, if reactor tube 1 is a tube in the furnace of a steam reformer), it will expand radially and longitudinally and the catalyst, having a lower expansion coefficient, will tend to slump and drop inside reactor tube 1. The location of the top of the catalyst bed at this point is not known with certainty. When the process is shut down, the catalyst particles would normally be subjected to considerable crushing forces. To obviate this danger, an upflow of suitable optionally preheated gas can be initiated at a rate sufficient to lift the catalyst particles within the tube 1 while the tube 1 and the catalyst cool. This minimizes crushing of the catalyst particles and re-orients the bed to a low packing density ready for re-start. A further advantage is that any fines and debris are removed at each shut-down.

The reactor tube 1 may be, for example, a catalyst tube in the furnace of a steam reformer. Since it is desirable to pack each catalyst tube with catalyst in exactly the same manner so that the pressure drop across each catalyst tube is substantially identical to the corresponding pressure drop for every other catalyst tube of the reformer furnace, the catalyst tubes can be loaded in turn by the general method described above. In this case an upflow of a gas, such as air, can be used in order to reduce the falling velocity of the particulate catalyst material. This air flow can be applied solely to the tube being loaded by plugging the upper ends of all other tubes and supplying air to a common lower header space, or by applying air to the bottom of each tube in turn. The latter option is preferred because other operations can then be performed on the loaded tube while other tubes are being loaded.

The invention is further illustrated by means of the following Examples.

EXAMPLE 1

A glass tube 1, which was 2 meters long with an internal diameter of 38.1 mm, was set up vertically with a follower 4 of the type illustrated in FIGS. 1 to 4 initially positioned at its bottom end. This follower 4 had a disc 12 of diameter 36 mm. A charge of 1.84 kg of a nickel catalyst (nickel on calcia-alumina support catalyst balls of nominal diameter 6 mm)

was dropped carefully into the tube. After loading, the upper perforate retainer 3 was fitted at a desired height in the tube 1. This retainer consisted of a Johnson wedge-wire screen comprising 1.5 mm wire with a 2 mm gap. The tube 1 was not filled fully to allow for the lower bulk density of the catalyst during the tests. Compressed air was introduced via a pressure regulator and flow rotameter (not shown) to the bottom of the tube 1 at a rate at least sufficient to lift the catalyst and the catalyst follower 4 such that a consolidated cushion of catalyst balls 5 was formed at the top of the tube 1 immediately under the retainer 3. The height of the catalyst bed 5 was measured before introducing air. The air flow was then reduced to allow the catalyst follower 4 to move back down to the bottom of tube 1 and also to allow the catalyst balls to move back down to the bottom of the tube 1. This procedure was repeated a number of times, from which data the following average apparent bulk densities in kg/m$^3$ were determined. The densities were found to be very repeatable, with the following small variations over 360 tests during which the catalyst was removed and replaced after 10, 20 and 120 tests:

| | |
|---|---|
| After loading (free drop) | 1157 +/− 1.0% (over four loadings) |
| Lifted (with air flow) | 1017 +/− 0.5% (within any one loading) |
| Lifted (with air flow) | 1017 +/− 1.5% (over all the tests) |
| Dumped (with no air flow) | 1000 +/− 0.5% (within any one loading) |
| Dumped (with no air flow) | 1000 +/− 1.0% (over all the tests) |

EXAMPLE 2

The weight of catalyst used in Example 1 was checked after 10, 20, 120 and 360 tests and showed 0.38% weight loss over 360 tests. In separate tests in the same apparatus the flow resistance of the fresh and worn catalyst particles used in Example 1 was compared. At an air flow rate of 49.14 Nm$^3$/h the fresh catalyst particles exhibited a pressure drop of $1.21 \times 10^5$ Pa/m, while at an air flow rate of 48.96 Nm$^3$/h the worn catalyst particles, after 360 tests, exhibited a flow resistance of $1.22 \times 10^5$ Pa/m.

EXAMPLE 3

The procedure of Example 1 was followed using 2.06 kg of nickel on α-alumina support catalyst balls of nominal diameter 6 mm from Dycat, Type 54/98. This catalyst support material is much more friable than that used in Examples 1 and 2 with only about 25% of the crush strength of the catalyst used in Examples 1 and 2. The weight of the catalyst was checked after 10, 60, 150, 300 and 390 tests and showed a total weight loss of 7.0% over 390 tests. During the tests catalyst fragments represented by this weight loss were visibly removed from the bed by the gas flow as dust. The amount lost in each group of tests decreased as follows, expressed as average weight % lost per lift and drop cycle: 0.085, 0.042, 0.026, 0.010, 0.009.

EXAMPLE 4

In separate tests in the same apparatus as was used in Examples 1 to 3 the flow resistance of the fresh catalyst particles and of the worn catalyst particles, after 390 tests, was compared. At an air flow rate of 49.67 Nm$^3$/h the fresh catalyst particles exhibited a pressure loss of $1.15 \times 10^5$ Pa/m, while at an air flow rate of 49.77 Nm$^3$/h the worn catalyst particles exhibited a-pressure loss of $1.32 \times 10^5$ Pa/m. The increase in pressure loss can be attributed to be due mainly to the reduced voidage (measured as 0.462 fresh and 0.449 worn) and the reduced size of the worn particles (which was estimated to be equivalent to a reduction in diameter, compared to the fresh catalyst particles, of 2%). This Example demonstrates that, because the process substantially removes the fines resulting from particle wear, the process allows the pressure drop in operation to remain as low as can be practically expected.

The invention claimed is:

1. A process in which an elastic fluid is contacted with a particulate solid, which process comprises the steps of:
    (a) providing a substantially vertical elongate tubular containment zone containing a charge of the particulate solid, the volume of the containment zone being greater than the settled volume of the charge of the particulate solid;
    (b) providing upper retainer means mounted at the upper end of the containment zone, the upper retainer means being permeable to the fluid but adapted to retain particulate solid in the containment zone, and follower means movably mounted in the containment zone beneath the charge of particulate solid for movement upwardly from the lower end of the containment zone upon upward flow of elastic fluid through the containment zone at a rate beyond a threshold rate; and
    (c) causing the elastic fluid to flow upwardly through the containment zone at a rate which is sufficient to cause particulate solid to rise up towards the upper end of the containment zone and form a cushion of particulate solid against the underside of the upper retainer means and which is in excess of the threshold rate so as to cause the follower means to move upwardly until it abuts against the underside of the cushion of particulate solid.

2. A process according to claim 1, wherein the elongate containment zone is one of a plurality of elongate containment zones connected in parallel.

3. A process according to claim 1, wherein at least part of said containment zone is of substantially uniform horizontal cross-section.

4. A process according to claim 3, wherein at least part of said containment zone comprises a tube of substantially circular cross section.

5. A process according to claim 4, wherein at least part of said containment zone comprises a tube having an internal diameter of about 6 inches (about 15.2 cm) or less.

6. A process according to claim 3, wherein at least part of said containment zone comprises a tube having an internal diameter of about 2 inches (about 5.08 cm) or less.

7. A process according to claim 1, wherein said follower means is arranged to block passage of elastic fluid up or down the containment zone apart from through a clearance gap between the internal surface of the containment zone and the follower means, the clearance gap having a width less than the smallest dimension of a non-fragmented particle of the particulate solid.

8. A process according to claim 7, wherein said follower means comprises a closed lower end portion for defining the gap means and an upper portion provided with elastic fluid passing means.

9. A process according to claim 1, wherein said elastic fluid passing means comprises a plurality of substantially concentric rings spaced one from another, the clearance between adjacent rings being less than the smallest dimension of a non-fragmented particle of the particulate solid.

10. A process according to claim 1, wherein said containment zone contains a plurality of types of particulate solid, each type being separated from an adjacent type by means of a respective follower means.

11. A process according to claim 1, wherein said particulate solid has at least one dimension less than about 10 mm.

12. A process according to claim 1, wherein said particulate solid is substantially spherical in shape.

13. A process according to claim 1, wherein said particulate solid comprises a catalyst.

14. A process according to claim 1, wherein after initial loading of the particulate solid, the pressure drop across the containment zone is measured in a measurement step.

15. A process according to claim 14, wherein particulate solid is added to or removed from the containment zone if the pressure drop measured does not conform to a predetermined value.

16. A process according to claim 14, wherein after initial loading of the particulate solid but prior to the measurement step elastic fluid is caused to flow upwardly through the containment zone at a rate in excess of the threshold rate so as to cause the particulate solid to form a cushion of particulate solid against the underside of the upper retainer and so as to cause the follower means to rise up the containment zone until it abuts against the underside of the cushion of particulate solid, and thereafter the upward flow of elastic fluid is reduced or discontinued so as to permit formation of a settled bed of particulate solid.

17. A process according to claim 1, wherein after initial loading of the particulate solid the settled volume of particulate solid in the containment zone is measured in a measurement step.

18. A process according to claim 17, wherein particulate solid is added to or removed from the containment zone if the settled volume of particulate solid in the containment zone does not conform to a predetermined value.

19. A process according to claim 1, wherein the particulate solid is a catalyst effective for catalysing a desired chemical reaction, and wherein an elastic fluid comprising a reaction feed mixture capable of undergoing the desired chemical reaction is passed in upflow mode through the containment zone.

20. A process according to claim 19, wherein said containment zone and said particulate solid are subjected to a temperature of at least about 500° C.

21. A process according to claim 20, wherein said desired chemical reaction is a partial oxidation reaction, wherein said elastic fluid comprises a partial oxidation feed mixture, wherein said particulate solid is a partial oxidation catalyst, and wherein the temperature of the containment zone and the partial oxidation catalyst is maintained by said partial oxidation reaction.

22. A process according to claim 20, wherein said desired chemical reaction is a steam reforming reaction, wherein said elastic fluid comprises a steam reforming feed mixture, wherein said particulate solid is a steam reforming catalyst, and wherein the temperature of the containment zone and the steam reforming catalyst is maintained by hot combustion gases external to said containment zone.

23. A process according to claim 1, wherein the particulate solid is a catalyst effective for catalysing a desired chemical reaction, and wherein an elastic fluid comprising a reaction feed mixture capable of undergoing the desired chemical reaction is passed in downflow mode through the containment zone.

24. Apparatus for effecting contact of an elastic fluid with a particulate solid comprising:
   (a) reactor means defining a substantially vertical elongate tubular containment zone for containing a charge of the particulate solid, the volume of the containment zone being greater than the settled volume of the particulate solid, the containment zone having an upper end and a lower end, and the reactor means being mounted so that the upper end of the containment zone lies above the lower end of the containment zone;
   (b) upper retainer means mounted at the upper end of the containment zone, the upper retainer means being permeable to the fluid but adapted to retain particulate solid in the containment zone; and
   (c) follower means movably mounted in the containment zone beneath the charge of particulate solid, the follower means being constructed and arranged within the containment zone so that it rises upwardly up the containment zone solely under the pressure exerted by the elastic fluid when the upward flow rate of elastic fluid is greater than a threshold flow rate until it abuts against the cushion of particulate solid.

25. Apparatus according to claim 24, wherein the elongate containment zone is one of a plurality of elongate containment zones connected in parallel.

26. Apparatus according to claim 24, wherein at least part of said containment zone is of uniform horizontal cross-section.

27. Apparatus according to claim 26, wherein at least part of said containment zone comprises a tube of substantially circular cross section.

28. Apparatus according to claim 27, wherein at least part of said containment zone comprises a tube having an internal diameter of about 6 inches (about 15.2 cm) or less.

29. Apparatus according to claim 27, wherein at least part of said containment zone comprises a tube having an internal diameter of about 2 inches (about 5.08 cm) or less.

30. Apparatus according to claim 24, wherein said follower means is arranged to block passage of elastic fluid up or down the containment zone apart from through a clearance gap between the internal surface of the containment zone and the follower means, the clearance gap having a width less than the smallest dimension of a non-fragmented particle of the particulate solid.

31. Apparatus according to claim 30, wherein said follower means comprises a closed lower end portion for defining the gap means and an upper portion provided with elastic fluid passing means.

32. Apparatus according to claim 31, wherein said elastic fluid passing means comprises a plurality of substantially concentric rings spaced one from another, the spacing between adjacent rings being less than the smallest dimension of a non-fragmented particle of the particulate solid.

33. Apparatus according to claim 24, wherein said containment zone is adapted for containing a plurality of types of particulate solid, each type being separated from an adjacent type by means of a respective follower means.

34. Apparatus according to claim 24, wherein the particulate solid is a catalyst effective for catalysing a desired chemical reaction, further including means for passing an elastic fluid comprising a reaction feed mixture capable of undergoing the desired chemical reaction in upflow mode through the containment zone.

35. Apparatus according to claim 24, wherein the particulate solid is a catalyst effective for catalysing a desired chemical reaction, further including means for passing an elastic fluid comprising a reaction feed mixture capable of undergoing the desired chemical reaction in downflow mode through the containment zone.

36. A method of loading a particulate solid into a substantially vertical tube in readiness for conducting a method in which an elastic fluid is contacted with the particulate solid, which method comprises the steps of:
(a) providing a substantially vertical elongate tubular reactor having an elongate containment zone for containing a charge of a particulate solid;
(b) providing at the lower end of the containment zone follower means movably mounted in the containment zone for movement upwardly from the lower end of the containment zone upon upward flow of elastic fluid through the containment zone at a rate beyond a threshold rate;
(c) loading a predetermined charge of the particulate solid into the containment zone on top of the follower means to provide a settled volume of the particulate solid that is less than the volume of the containment zone;
(d) mounting at the upper end of the containment zone upper retainer means permeable to the fluid but adapted to retain particulate solid in the containment zone; and
(e) causing an elastic fluid to flow upwardly through the containment zone at a rate which is sufficient to cause particulate solid to rise up towards the upper end of the containment zone and form a cushion of particulate solid against the underside of the upper retainer means and which is in excess of the threshold rate so as to cause the follower means to move upwardly until it abuts against the underside of the cushion of particulate solid.

37. A method according to claim 36, wherein the elongate containment zone is one of a plurality of elongate containment zones connected in parallel.

38. A method according to claim 36, wherein said containment zone is of uniform horizontal cross-section.

39. A method according to claim 38, wherein at least part of said containment zone comprises a tube of substantially circular cross section.

40. A method according to claim 39, wherein at least part of said containment zone comprises a tube having an internal diameter of about 6 inches (about 15.2 cm) or less.

41. A method according to claim 39, wherein at least part of said containment zone comprises a tube having an internal diameter of about 2 inches (about 5.08 cm) or less.

42. A method according to claim 36, wherein said follower means is arranged to block passage of elastic fluid up or down the containment zone apart from through gap means between the internal surface of the containment zone and the follower means, the gap means having a width less than the smallest dimension of a non-fragmented particle of the particulate solid.

43. A method according to claim 42, wherein said follower means comprises a closed lower end portion for defining the gap means and an upper portion provided with elastic fluid passing means.

44. A method according to claim 36, wherein said elastic fluid passing means comprises a plurality of substantially concentric rings spaced one from another, the clearance between adjacent rings being less than the smallest dimension of a non-fragmented particle of the particulate solid.

45. A method according to claim 36, wherein said particulate solid has at least one dimension less than about 10 mm.

46. A method according to claim 36, wherein said particulate solid is substantially spherical in shape.

47. A method according to claim 36, wherein said particulate solid comprises a catalyst.

48. A method according to claim 36, wherein the settled volume of particulate solid in the containment zone is measured in a measurement step.

49. A method according to claim 48, wherein particulate solid is added to or removed from the containment zone if the settled volume of particulate solid in the containment zone does not conform to a predetermined value.

50. A method according to claim 36, wherein the method includes the following steps:
(f) measuring the pressure drop across the containment zone in a measurement step; and
(g) comparing the measured pressure drop with a design value.

51. A method according to claim 50, wherein particulate solid is added to or removed from the containment zone if the measured pressure drop does not conform to the design value, whereafter the pressure drop is measured again.

52. A method according to claim 49, wherein after initial loading of the particulate solid but prior to the measurement step elastic fluid is caused to flow upwardly through the containment zone at a rate in excess of the threshold rate so as to cause the particulate solid to form a cushion of particulate solid against the underside of the upper retainer means and so as to cause the follower means to move upwardly until it abuts against the underside of the cushion of particulate solid, and thereafter the upward flow of elastic fluid is discontinued so as to permit formation of a settled bed of particulate solid.

53. A method according to claim 36, wherein said particulate solid is selected from a partial oxidation catalyst and a steam reforming catalyst.

54. A method according to claim 36, wherein in step (e) the upward flow of elastic fluid is maintained for a period and at a rate sufficient to cause substantially all particles which are smaller than a predetermined design particle size and are sufficiently small to pass through the upper retainer means to pass through the upper retainer means.

* * * * *